United States Patent
Adcock

(10) Patent No.: US 7,575,520 B2
(45) Date of Patent: Aug. 18, 2009

(54) TAP AND A METHOD OF TAPPING

(75) Inventor: Neil Walter Lindh Adcock, Ragdale (GB)

(73) Assignee: Adcock Technology Limited, Leicestershire (GB)

( * ) Notice: Subject to any disclaimer, the term of this patent is extended or adjusted under 35 U.S.C. 154(b) by 1 day.

(21) Appl. No.: 10/566,918

(22) PCT Filed: Aug. 2, 2004

(86) PCT No.: PCT/GB2004/003304

§ 371 (c)(1),
(2), (4) Date: Feb. 3, 2006

(87) PCT Pub. No.: WO2005/014214

PCT Pub. Date: Feb. 17, 2005

(65) Prior Publication Data

US 2006/0199654 A1    Sep. 7, 2006

(30) Foreign Application Priority Data

Aug. 4, 2003   (GB) ................... 0318227.6

(51) Int. Cl.
*B21J 13/02*   (2006.01)
(52) U.S. Cl. ........................ 470/204; 470/198
(58) Field of Classification Search ............ 72/88, 72/469; 470/18, 96, 105, 198, 204, 8, 9, 470/10, 199; 408/226, 227, 228, 222
See application file for complete search history.

(56) References Cited

U.S. PATENT DOCUMENTS

| 2,307,680 | A | * | 1/1943 | Hohwart | 408/217 |
| 2,807,813 | A | | 10/1957 | Welles | |
| 2,991,491 | A | * | 7/1961 | Welles, Jr. | 470/204 |
| 3,069,961 | A | * | 12/1962 | Baubles | 411/398 |
| 3,088,141 | A | * | 5/1963 | Tansey | 470/80 |
| 3,125,772 | A | * | 3/1964 | Beck | 408/218 |
| 3,226,743 | A | * | 1/1966 | Watkins | 470/204 |
| 3,248,747 | A | * | 5/1966 | Scott | 470/204 |

(Continued)

FOREIGN PATENT DOCUMENTS

DE    19749845    5/1999

(Continued)

OTHER PUBLICATIONS

Intl Search Rpt, Nov. 24, 2004.

(Continued)

*Primary Examiner*—Edward Tolan
(74) *Attorney, Agent, or Firm*—Gable Gotwals

(57) ABSTRACT

The present invention provides a tap (10) adapted for formation of female screw-threads in a plurality of metal parts. Each female screw-thread is capable of imparting translational motion to a threaded second member engaged therewith, the threaded second member having a matching male screw-thread and the translational motion occurring on relative rotation between the first metal part and the threaded second member. The tap (10) is fluteless and comprises a threaded portion (23) with a triangular form thread (11) with an angle of thread (gamma) in the range 29°-40° and radiussed crests (16). The present invention also relates to a method of using such a tap.

25 Claims, 2 Drawing Sheets

U.S. PATENT DOCUMENTS

| | | | |
|---|---|---|---|
| 3,258,797 A * | 7/1966 | Budd | 470/204 |
| 3,492,908 A * | 2/1970 | Thurston | 411/418 |
| 3,775,792 A * | 12/1973 | Leonard | 470/204 |
| 3,802,015 A | 4/1974 | Chase et al. | |
| 3,975,788 A * | 8/1976 | Reynolds | 470/20 |
| 4,527,932 A * | 7/1985 | Onasch et al. | 411/411 |
| 4,666,348 A * | 5/1987 | Corrette | 407/24 |
| 5,035,019 A * | 7/1991 | Dias | 470/204 |
| 5,405,227 A | 4/1995 | His et al. | |
| 5,624,219 A * | 4/1997 | Hamanaka | 411/308 |
| 5,797,710 A * | 8/1998 | Sawabe et al. | 408/222 |
| 6,685,573 B2 * | 2/2004 | Hikosaka et al. | 470/204 |
| 6,702,537 B2 * | 3/2004 | Neuhengen | 411/414 |
| 6,949,100 B1 * | 9/2005 | Venturini | 606/318 |
| 2001/0014625 A1 | 8/2001 | Glimpel et al. | |

FOREIGN PATENT DOCUMENTS

| | | |
|---|---|---|
| EP | 0281203 | 9/1988 |
| EP | 1134051 | 9/2001 |
| GB | 1357720 | 6/1974 |
| GB | 2324752 | 11/1998 |
| RU | 2009750 | 3/1994 |
| SU | 1371811 | 2/1988 |
| WO | WO 02/094490 | 11/2002 |

OTHER PUBLICATIONS

Intl Prel Rpt, Dec. 15, 2005.
GB Srch/Exam Rp, Nov. 27, 2003.
Examination Rep, Oct. 9, 2007, European Patent Office.

* cited by examiner

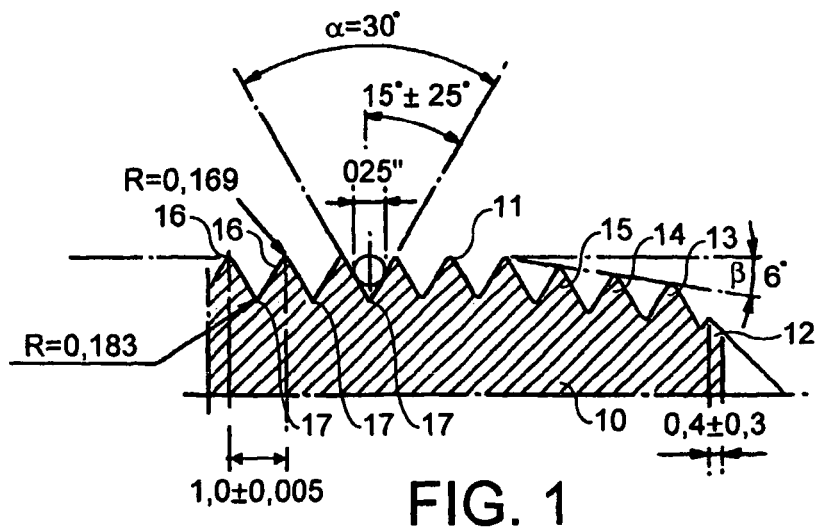
FIG. 1
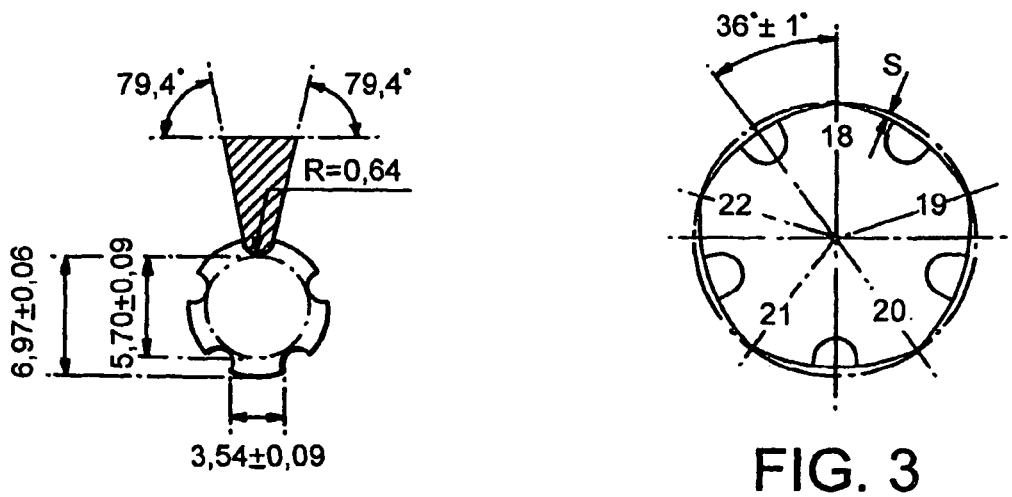
FIG. 2
FIG. 3
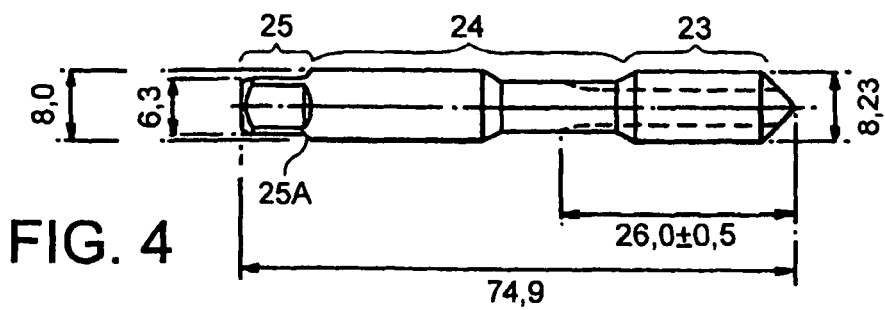
FIG. 4

TAP AND A METHOD OF TAPPING

The present invention relates to a tap and to a method of tapping.

In particular the present invention relates to a tap designed to cut a female translational screw-thread in metal, i.e. the type of screw-thread designed to impart longitudinal motion to a rod with a matched male thread on the exterior thereof on relative rotational motion therebetween. Typically, in the past such taps have had a thread trapezoidal in form since it has been accepted that this is best practice for a thread designed to impart translational motion. However, the taps necessary to create trapezoidal female screw-threads are typically expensive, wear quickly and have a long cycle time compared to a tap according to the present invention. In part this is due to the fact that the trapezoidal taps are of necessity fluted, because of the amount of material that needs to be moved to form a female trapezoidal screw-thread.

The present invention provides in a first aspect a tap adapted for formation of female screw-threads in a plurality of metal parts, each female screw-thread being capable of imparting translational motion to a threaded second member engaged therewith, the threaded second member having a matching male screw-thread and the translational motion occurring on relative rotation between the metal part and the threaded second member, the tap being fluteless and comprising a threaded portion with a triangular form thread with an angle of thread in the range 29°-40° and radiussed crests.

The tap of the present invention costs less to manufacture, is more wear-resistant and has a shorter cycle time than the trapezoidal types of the prior art. In trials a trapezoidal tap lasted for the creation of 500 parts whilst the tap of the present invention lasted 740 parts. The cycle time of the trapezoidal tap was 26 seconds, compared with a 4.5 second cycle time of the tap of the present invention.

The present invention in a second aspect provides a product having a tapped bore with a female screw-thread formed using the tap described above.

The present invention in a third aspect provides a method of tapping a product in which a female screw-thread is formed using a tap as described above.

The present provides in a fourth aspect a method of manufacture and use of apparatus which has a first metal object with a female screw-thread and a second metal object with a matching male screw-thread, the method comprising the steps of:

forming in the first metal object a female screw-thread using a tap as described above;

forming on at least a part of the second metal object a male screw-thread matching the female screw-thread of the first metal object;

engaging the male screw-thread of the second metal object with the female screw-thread of the first metal object; and rotating one of the first and second metal objects relative to the other in order to occasion translational motion of the second metal object relative to the first metal object.

In the prior art there has also been encountered a technical problem of setting in place a threaded rod between two brackets with the brackets having female screw-thread receiving the male thread of the threaded rod and with the brackets accurately spaced.

The present invention provides in a third aspect a method of securing a threaded rod to a pair of spaced apart brackets comprising the steps of:

forming female screw-threads in each of the pair of spaced apart brackets, the thread of each of the female screw-threads matching the external thread on the threaded rod;

during forming the female screw threads in the brackets setting a chosen orientational relationship between the female screw-threads of the pair of brackets;

securing the brackets one each to the ends of the threaded rod by engagement of the external thread of the threaded rod with the female screw-threads of the brackets and by relative rotation between the rod and the brackets; and setting a spacing between the brackets by occasioning a chosen number of complete relative rotations between each bracket and the threaded rod as the brackets are rotated on to the ends of the threaded rod.

A preferred embodiment of tap according to the present invention will now be described along with examples of preferred methods of using the tap, all with reference to the accompanying drawings in which:

FIG. 1 is a cross-section through a tap according to the present invention, taken axially along the tap;

FIG. 2 is a first transverse cross-section through the tap of FIG. 1;

FIG. 3 is a second transverse cross-section through the tap of FIG. 1;

FIG. 4 is a side view of the tap of FIGS. 1 to 3; and

Figure 5:
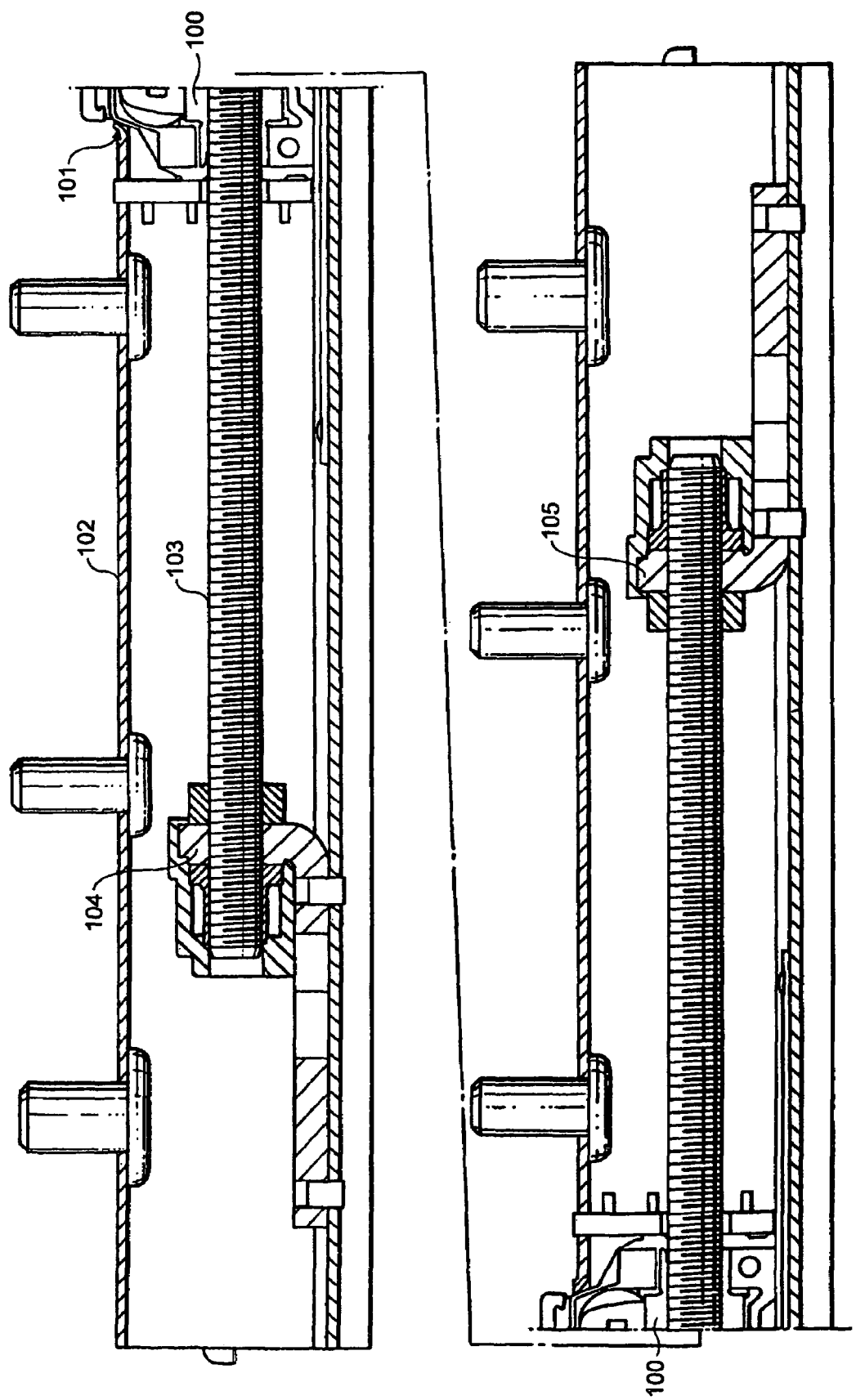
FIG. 5 is a cross-sectional view of an arrangement of threaded rod and gearbox, the threaded rod being secured by threaded brackets with female screw-threads formed by a tap of the present invention.

FIG. 1 shows a cross-section through a front section of a tap 10 according to the present invention. The tap 10 is fluteless, although it may have one or more lubrication grooves. The tap 10 has a thread 11 which is triangular in form. The angle $\alpha$ of the thread 11 is 30° (i.e. a half-angle of 15°) and the thread has a pitch of 1 mm with a tolerance of 0.005 mm. The tap 10 has a chamfer of four threads 12-15 with a chamfer angle $\beta$ of 6°. The tap 10 has crests 16 which are each rounded with a radius (when viewed in an axially extending cross-section—FIG. 1) of 0.169 mm. The roots 17 are each rounded with a radius (when viewed in an axially extending cross-section—FIG. 1) of 0.183 mm. The roots 17 are separated by 36° (plus or minus 1°) when viewed in a transverse cross-section as in FIG. 3; there are five lands 18-22. As seen in FIG. 4, the tap 10 has a threaded portion 23, a shank portion 24 and a square cross-section portion 25 to be engaged by a chuck. The distance between the end 25A of the square section 25 and the beginning of the threads on the threaded portion 23 is defined to a close tolerance.

The tap 10 is provided with two starts so that there are two helical grooves running along the threaded portion 23. The threaded portion 32 at least has a titanium nitride coating.

When the tap 10 is used to form a female screw-thread the thread is flow formed rather than cut (as is the case with the fluted trapezoidal thread taps usually used). This gives a very good surface finish to the formed thread and good conformity to the thread defined on the tap. This is crucial for good meshing efficiency.

Above the angle of thread is given as 30° (15° half angle) and this is preferred because it is ideal for the generation of translational motion when interacting with a matched male thread. However, angles in the range of 29°-40° (14.5°-20° half angles) would also work well. The radius of each root 17 will be determined as a proportion of thread depth. In the identified example the root radius 0.183 mm is approximately 20% of the thread depth of 0.924 mm. The percentage must be sufficient to allow for material flow into the thread without the material completely filling the thread. Whilst above the tap 10 has two start points and two co-extending helical threads, it may in some circumstance be preferred to have three start points and three co-extending helical threads. Whilst above the roots 17 are shown as rounded, this is not essential and they could be e.g. flat-bottomed.

The tap 10 can be used to form an internal thread of a rotating nut 100 of a gearbox 101 used in sliding rail mechanisms for a car seat (see FIG. 5). The gearbox 101 is secured to a rail 102. A threaded rod 103 is fixedly secured to a pair of brackets 104 and 105, each of which also has an internal screw thread formed by use of the tap 10. It is important that the distance between the brackets 104 and 105 is set accurately and so the applicant proposes tapping the brackets in a method in which the helical thread in one bracket is orientated with respect to the helical thread in the other bracket in a chosen relationship. Thus when the threaded rod 103 is secured to the brackets 104 and 105 all that needs to be done to ensure a correct spacing of the brackets is the rotation of the brackets on the rod (or vice versa) a set number of times.

The invention claimed is:

1. A tap adapted for formation of female screw-threads in a plurality of metal parts, each female screw-thread being capable of imparting translational motion to a threaded second member engaged therewith, the threaded second member having a matching male screw-thread and the translational motion occurring on relative rotation between the first metal part and the threaded second member, the tap being fluteless and comprising a threaded portion with a symmetrical triangular form thread, wherein the symmetrical triangular form thread has an angle of thread ($\alpha$) in the range 29°-40° and radiussed crests with a radius of curvature in the range of 0.165 to 0.175 mm.

2. A tap as claimed in claim 1 wherein the angle of thread ($\alpha$) is 29° to 31°.

3. A tap as claimed in claim 2 wherein the angle of thread ($\alpha$) is 30°.

4. A tap as claimed in claim 1 wherein the tap has a chamfered front end.

5. A tap as claimed in claim 4 wherein the chamfered front end extends over at least four turns of the thread.

6. A tap as claimed in claim 4 wherein the chamfered front end has a chamfer angle ($\beta$) in the range 5.5° to 6.5°.

7. A tap as claimed in claim 1 which has at least two starts.

8. A tap as claimed in claim 1 wherein the roots of the threaded portion of the tap are radiussed.

9. A tap as claimed in claim 8 when the radiussed roots have a radius of curvature in the range 0.178 mm to 0.188 mm.

10. A tap as claimed in claim 1 wherein the thread has a pitch of 0.995 mm to 1.005 mm.

11. A tap as claimed in claim 1 comprising additionally lubrication grooves.

12. A tap as claimed in claim 1 comprising a shank portion extending rearwardly from the threaded portion and a rearmost portion with a plurality of flat surfaces to enable engagement of the tap by a chuck.

13. A tap as claimed in claim 12 in which at least one of the flat surfaces is precision machined in order to precisely set a distance between the front of the tap and at least one end of the flat surface.

14. A tap adapted for formation of female screw-threads in a plurality of metal parts, each female screw-thread being capable of imparting translational motion to a threaded second member engaged therewith, the threaded second member having a matching male screw-thread and the translational motion occurring on relative rotation between the first metal part and the threaded second member, the tap being fluteless and comprising a threaded portion with a symmetrical triangular form thread, wherein the symmetrical triangular form thread has an angle of thread in the range 29°-40° and radiussed crests, and the roots of the threaded portion of the tap are radiussed with a radius of curvature in the range of 0.178 mm to 0.188 mm.

15. A tap as claimed in claim 14 wherein the angle of thread is 29° to 31°.

16. A tap as claimed in claim 15 wherein the angle of thread is 30°.

17. A tap as claimed in claim 14 wherein the tap has a chamfered front end.

18. A tap as claimed in claim 17 wherein the chamfered front end extends over at least four turns of the thread.

19. A tap as claimed in claim 17 wherein the chamfered front end has a chamfer angle in the range 5.5° to 6.5°.

20. A tap as claimed in claim 14 which has at least two starts.

21. A tap as claimed in claim 14 wherein the radiussed crests have a radius of curvature in the range of 0.165 to 0.175 mm.

22. A tap as claimed in claim 14 wherein the thread has a pitch of 0.995 mm to 1.005 mm.

23. A tap as claimed in claim 14 comprising additionally lubrication grooves.

24. A tap as claimed in claim 14 comprising a shank portion extending rearwardly from the threaded portion and a rearmost portion with a plurality of flat surfaces to enable engagement of the tap by a chuck.

25. A tap as claimed in claim 24 in which at least one of the flat surfaces is precision machined in order to precisely set a distance between the front of the tap and at least one end of the flat surface.

* * * * *